US012183175B2

(12) United States Patent
Bergman

(10) Patent No.: US 12,183,175 B2
(45) Date of Patent: Dec. 31, 2024

(54) SECURITY TAG WITH TACK POSITION FEEDBACK

(71) Applicant: Adam S. Bergman, Boca Raton, FL (US)

(72) Inventor: Adam S. Bergman, Boca Raton, FL (US)

(73) Assignee: SENSORMATIC ELECTRONICS, LLC, Boca Raton, FL (US)

( * ) Notice: Subject to any disclaimer, the term of this patent is extended or adjusted under 35 U.S.C. 154(b) by 78 days.

(21) Appl. No.: 16/752,322

(22) Filed: Jan. 24, 2020

(65) Prior Publication Data

US 2021/0090415 A1 Mar. 25, 2021

Related U.S. Application Data

(60) Provisional application No. 62/902,709, filed on Sep. 19, 2019.

(51) Int. Cl.
*G08B 13/24* (2006.01)
*E05B 73/00* (2006.01)

(52) U.S. Cl.
CPC ...... *G08B 13/2431* (2013.01); *E05B 73/0052* (2013.01); *G08B 13/2434* (2013.01); *G08B 13/2482* (2013.01)

(58) Field of Classification Search
CPC ............ G08B 13/2411; G08B 13/2414; G08B 13/2417; G08B 13/242; G08B 13/2431; G08B 13/2434; G08B 13/2448; G08B 13/246; G08B 13/2462; G08B 13/2482; E05B 73/0017; E05B 73/0047; E05B 73/0052; E05B 73/0064; G06K 19/0723
See application file for complete search history.

(56) References Cited

U.S. PATENT DOCUMENTS 7,391,327 B2 6/2008 Ho
2002/0171550 A1* 11/2002 Hirose .................. E05B 45/005 340/568.1
2010/0097223 A1* 4/2010 Kruest ................ E05B 47/0009 340/572.1

(Continued)

FOREIGN PATENT DOCUMENTS

CN 107924601 A 4/2018

OTHER PUBLICATIONS

Office Action issued Jul. 26, 2024 for Chinese Patent Application No. 202080073449.4.

*Primary Examiner* — Kam Wan Ma
(74) *Attorney, Agent, or Firm* — ArentFox Schiff LLP

(57) ABSTRACT

Systems and methods for verifying a detachment of a security tag from an article. The methods comprise: using a voltage induced in an internal circuit of the security tag by a magnetic field generated by a detaching unit to power a controller of the security tag; receiving, by the security tag, a first signal sent from the detaching unit; selectively supplying power to an electro-mechanical lock mechanism of the security tag for a certain amount of time to cause a pin to be released from a lock, in response to the first signal; and communicating, from the security tag, a second signal indicating whether or not the pin was released. The voltage is no longer induced in the internal circuit by the detaching unit when the second signal indicates that the pin was released.

16 Claims, 8 Drawing Sheets

(56) References Cited

U.S. PATENT DOCUMENTS

| | | | | |
|---|---|---|---|---|
| 2014/0208559 | A1 | 7/2014 | Stewart et al. | |
| 2014/0232530 | A1 | 8/2014 | Stewart | |
| 2014/0253333 | A1* | 9/2014 | Patterson | E05B 73/0064 340/572.4 |
| 2016/0117583 | A1* | 4/2016 | Butler | H04L 67/04 340/10.51 |
| 2016/0140820 | A1* | 5/2016 | Joseph | G08B 13/2417 340/572.1 |
| 2016/0321894 | A1 | 11/2016 | Schneider | |
| 2017/0178479 | A1* | 6/2017 | Ellers | G08B 13/2434 |
| 2018/0261062 | A1* | 9/2018 | Casanova | E05B 73/0047 |
| 2019/0244454 | A1* | 8/2019 | Feltham | G07C 9/00182 |

* cited by examiner

SECURITY TAG WITH TACK POSITION FEEDBACK

CROSS-REFERENCE TO RELATED APPLICATIONS

The present application claims priority to U.S. Provisional Patent Application Ser. No. 62/902,709, which was filed on Sep. 19, 2019. The contents of the Provisional Patent Application are incorporated herein in its entirety.

FIELD

This document relates generally to security tag detachment systems. More particularly, this document relates to systems and methods for providing security tags with tack position feedback.

BACKGROUND

Electronic Article Surveillance ("EAS") systems are often used by retail stores in order to minimize loss due to theft. One common way to minimize retail theft is to attach a security tag to an article such that an unauthorized removal of the article can be detected. In some scenarios, a visual or audible alarm is generated based on such detection. For example, a security tag with an EAS element (e.g., an acousto-magnetic element) can be attached to an article offered for sale by a retail store. An EAS interrogation signal is transmitted at the entrance and/or exit of the retail store. The EAS interrogation signal causes the EAS element of the security tag to produce a detectable response if an attempt is made to remove the article without first detaching the security tag therefrom. The security tag must be detached from the article upon purchase thereof in order to prevent the visual or audible alarm from being generated.

One type of security tag can include a tag body which engages a tack. The tack usually includes a tack head and a sharpened pin extending from the tack head. In use, the pin is inserted through the article to be protected. The shank or lower part of the pin is then locked within a cooperating aperture formed through the housing of the tag body. In some scenarios, the tag body may contain a Radio Frequency Identification ("RFID") element or label. The RFID element can be interrogated by an RFID reader to obtain RFID data therefrom.

The security tag may be removed or detached from the article using a detaching unit. Examples of such detaching units are disclosed in U.S. Patent Publication No. 2014/0208559 ("the '559 patent application) and U.S. Pat. No. 7,391,327 ("the '327 patent"). The detaching units disclosed in the listed patents are designed to operate upon a two-part hard security tag. Such a security tag comprises a pin and a molded plastic enclosure housing EAS marker elements. During operation, the pin is inserted through an article to be protected (e.g., a piece of clothing) and into an aperture formed through at least one sidewall of the molded plastic enclosure. The pin is securely coupled to the molded plastic enclosure via a clamp disposed therein. The pin is released by a detaching unit via application of a magnetic field by a magnet or mechanical probe inserted through an aperture in the hard tag. The magnet or mechanical probe is normally in a non-detach position within the detaching unit. When the RFID enabled hard tag is inserted into the RFID detacher nest, a first magnetic field or mechanical clamp is applied to hold the tag in place while the POS transaction is verified. Once the transaction and payment have been verified, the second magnet or the mechanical probe is caused to travel from the non-detach position to a detach position so as to release the tag's locking mechanism (e.g., a clamp). The pin can now be removed from the tag. Once the pin is removed and the article is released, the security tag will be ejected or unclamped from the detacher nest.

SUMMARY

The present disclosure concerns systems and methods for verifying a detachment of a security tag from an article. The methods comprise: using a voltage induced in an internal circuit of the security tag by a magnetic field generated by a detaching unit to power a controller of the security tag; receiving, by the security tag, a first signal sent from the detaching unit; selectively supplying power to an electro-mechanical lock mechanism of the security tag for a certain amount of time to cause a pin to be released from a lock, in response to the first signal; and communicating, from the security tag, a second signal indicating whether or not the pin was released. When the second signal indicates that the pin was released, the voltage is no longer induced in the internal circuit by the detaching unit, and/or the article is accepted for purchase.

In some scenarios, the methods also comprise: receiving a third signal from the detaching unit when the second signal indicates that the pin was not released; selectively supplying the power once again to the electro-mechanical lock mechanism for the certain amount of time, in response to the third signal; and communicating, from the security tag, a fourth signal indicating whether or not the pin was released. A counter may be incremented when the second signal indicates that the pin was not released, prior to when the third signal is sent from the detaching unit. The voltage is no longer induced in the internal circuit by the detaching unit when the fourth signal indicates that the pin was released.

In those or other scenarios, the methods also comprise: determining whether a value of a counter is less than or equal to a given number, when the second signal indicates that the pin was not released; and repeating the using, receiving, selectively supplying and communicating when the second signal indicates that the pin was not released and the value of the counter is less than or equal to the given number. The voltage is no longer induced in the internal circuit by the detaching unit when the second signal indicates that the pin was not released and when then value of the counter exceeds the given number.

The present disclosure concerns systems and methods for operating a detaching unit. The methods comprise: generating, by the detaching unit, a magnetic field to cause a voltage to be induced in an internal circuit of a security tag; communicating, from the detaching unit, a first signal to cause power to be selectively supplied to an electro-mechanical lock mechanism of the security tag for a certain amount of time to cause a pin to be released from a lock; receiving, from the security tag, a second signal indicating whether or not the pin was released; and discontinuing generation of the magnetic field when the second signal indicates that the pin was released.

The methods may also comprise: communicating a third signal from the detaching unit when the second signal indicates that the pin was not released to cause the power to once again be selectively supplied to the electro-mechanical lock mechanism for the certain amount of time; receiving, from the security tag, a fourth signal indicating whether or not the pin was released; incrementing a counter when the second signal indicates that the pin was not released, prior to when the third signal is sent from the detaching unit; discontinuing generation of the magnetic field when the fourth signal indicates that the pin was released; causing an article to be accepted for purchase when the second signal indicates that the pin was released; determining whether a value of a counter is less than or equal to a given number, when the second signal indicates that the pin was not released; repeating the generating, communicating, and receiving when the second signal indicates that the pin was not released and the value of the counter is less than or equal to the given number; and/or discontinuing generation of the magnetic field when the second signal indicates that the pin was not released and when then value of the counter exceeds the given number.

DESCRIPTION OF THE DRAWINGS

The present solution will be described with reference to the following drawing figures, in which like numerals represent like items throughout the figures.

DETAILED DESCRIPTION

Figure 1:
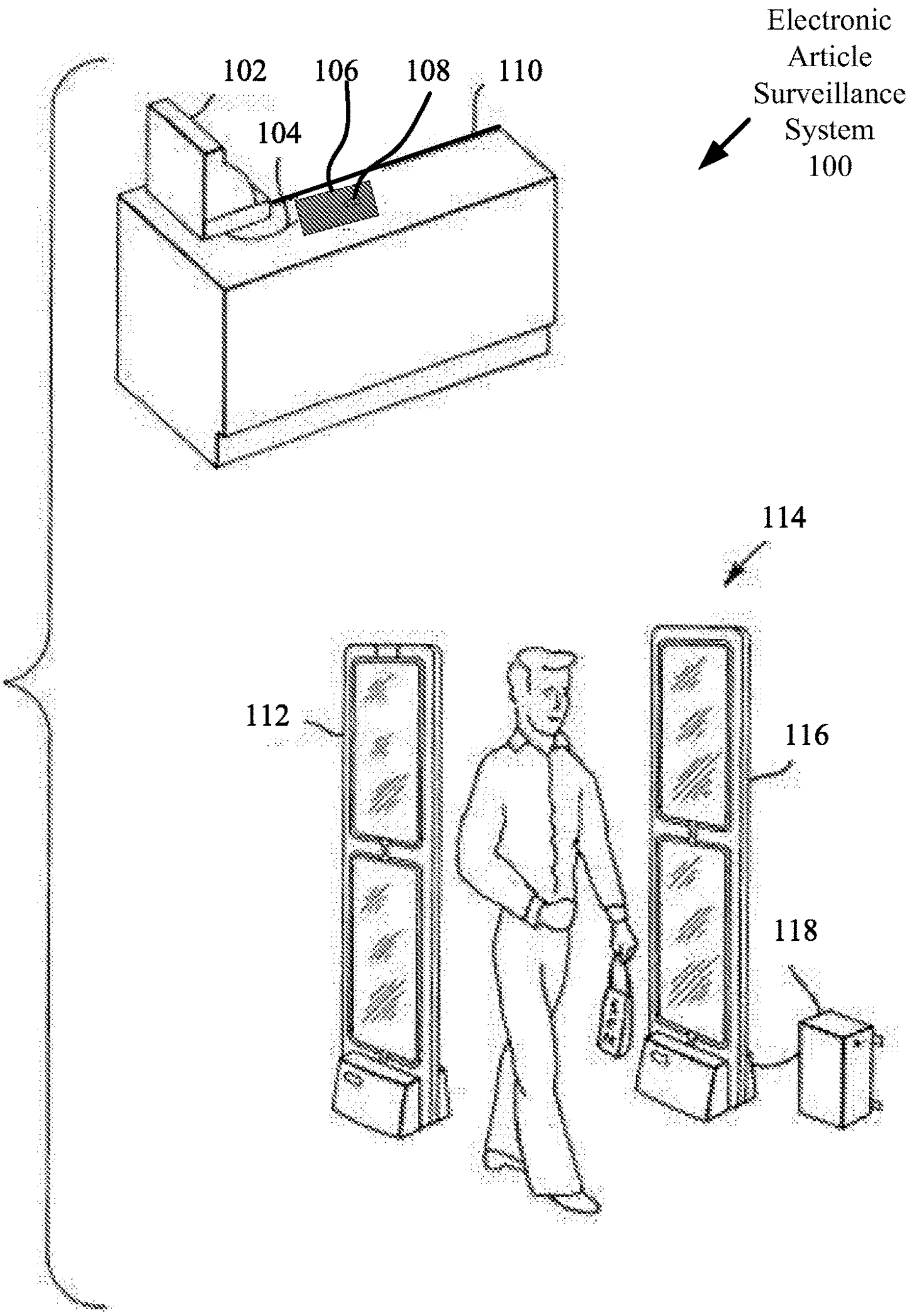
FIG. 1 is an illustration of an illustrative architecture for an EAS system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution will now be described with respect to FIGS. 1-5. The present solution generally relates to novel systems and methods for verifying a detachment of a security tag from an article. The methods comprise: detecting when the security tag is in proximity to a detaching unit; causing a release of a pin of a security tag coupled from the article; detecting when the pin of the tag has been successfully released; and adding the article to a bill of sale for a purchase transaction when such a detection has been made.

Referring now to FIG. 1, there is provided an illustration of an illustrative EAS system 100. EAS systems are well known in the art, and therefore will not be described in detail herein. Still, it should be understood that the present solution will be described herein in relation to an acousto-magnetic (or magnetostrictive) EAS system. The present solution is not limited in this regard. The EAS system 100 may alternatively include a magnetic EAS system, an RF EAS system, a microwave EAS system or other type of EAS system. In all cases, the EAS system 100 generally prevents the unauthorized removal of articles from a retail store, as well as the verification that pins have been removed from respective tag bodies of security tags when removal of the corresponding articles from a retail store is authorized.

In this regard, security tags 108 are securely coupled to articles (e.g., clothing, toys, and other merchandise) offered for sale by the retail store. Illustrative architectures of the security tags 108 will be described below in relation to FIGS. 3-4. At the exits of the retail store, detection equipment 114 sounds an alarm or otherwise alerts store employees when it senses an active security tag 108 in proximity thereto. Such an alarm or alert provide notification to store employees of an attempt to remove an article from the retail store without proper authorization.

In some scenarios, the detection equipment 114 comprises antenna pedestals 112, 116 and an electronic unit 118. The antenna pedestals 112, 116 are configured to create a surveillance zone at the exit or checkout lane of the retail store by transmitting an EAS interrogation signal. The EAS interrogation signal causes an active security tag 108 to produce a detectable response if an attempt is made to remove the article from the retail store. For example, the security tag 108 can cause perturbations in the interrogation signal, as will be described in detail below.

The antenna pedestals 112, 116 may also be configured to act as RFID readers. In these scenarios, the antenna pedestals 112, 116 transmit an RFID interrogation signal for purposes of obtaining RFID data from the active security tag 108. The RFID data can include, but is not limited to, a unique identifier for the active security tag 108. In other scenarios, these RFID functions are provided by devices separate and apart from the antenna pedestals.

The security tag 108 can be deactivated and detached from the article using a detaching unit 106. Typically, the security tag 108 is removed or detached from the articles by store employees when the corresponding article has been purchased or has been otherwise authorized for removal from the retail store. The detaching unit 106 is located at a checkout counter 110 of the retail store and communicatively coupled to a POS terminal 102 via a wired link 104. In general, the POS terminal 102 facilitates the purchase of articles from the retail store.

Detaching units and POS terminals are well known in the art, and therefore will not be described herein. The POS terminal 102 can include any known or to be known POS terminal with or without any modifications thereto. However, the detaching unit 106 includes any known or to be known detaching unit selected in accordance with a particular application which has some hardware and/or software modifications made thereto so as to facilitate the implementation of the present solution (which will become more evident below). The hardware and/or software modifications can include, but are not limited to, an inclusion of an RFID enabled device to facilitate RF communications with security tags and/or a coil for selectively emitting energy that is to be harvested by security tags.

In some cases, the detaching unit 106 is configured to operate as an RFID reader. As such, the detaching unit 106 may transmit an RFID interrogation signal for purposes of obtaining RFID data from a security tag. Upon receipt of the tag's unique identifier and/or an article's identifier, the detaching unit 106 communicates the same to the POS terminal 102. At the POS terminal 102, a determination is made as to whether the received identifier(s) is(are) valid for a security tag of the retail store. If it is determined that the received identifier(s) is(are) valid for a security tag of the retail store, then the POS terminal 102 notifies the detaching unit 106 that the same has been validated, and therefore the security tag 108 can be removed from the article.

At this time, the detaching unit 106 performs operations to cause an internal coil to generate a magnetic field. This magnetic field induces a voltage in a coil L of the security tag 108 via inductive coupling. This voltage charges an energy harvesting capacitor C of the security tag 108. The energy stored by the energy harvesting capacitor C is used to power a controller of the security tag 108.

The detaching unit 106 also performs operations to communicate a detachment command to the security tag 108 via an RF signal. The controller of the security tag processes the received RF signal to extract the detachment command therein.

In response to the detachment command, the controller of the security tag may perform operations to selectively close a switch (which is normally open). This switch can include, but is not limited to, a transistor. When the switch is closed, energy is allowed to flow (optionally from the energy harvesting capacitor) to a detachment mechanism of the security tag's electro-mechanical lock mechanism. At this time, actuation of the detachment mechanism occurs so that a pin is released. The electro-mechanical lock mechanism is able to detect whether or not the pin is successfully released. The electro-mechanical lock mechanism provides a feedback signal to the controller of the security tag indicating whether or not the pin was successfully released.

In turn, the controller causes the security tag 108 to provide a feedback signal to the detaching unit 106 via an RF communication. The feedback signal indicates whether or not the pin was successfully released. If the pin was successfully released, then the article to which the security tag 108 was coupled is added to a bill of sale.

In contrast, if the feedback signal indicates that the pin was not successfully released, then the process is repeated, i.e., the detaching unit 106 sends another detach command to the security tag 108 and receives another feedback signal from the security tag 108. A pre-defined number of iterations (e.g., 3) of this process are performed. In the event that the pin is not successfully released during the iterations, then the article is not added to the bill of sale and another article of the same type may be acquired for purchase.

Figure 2:
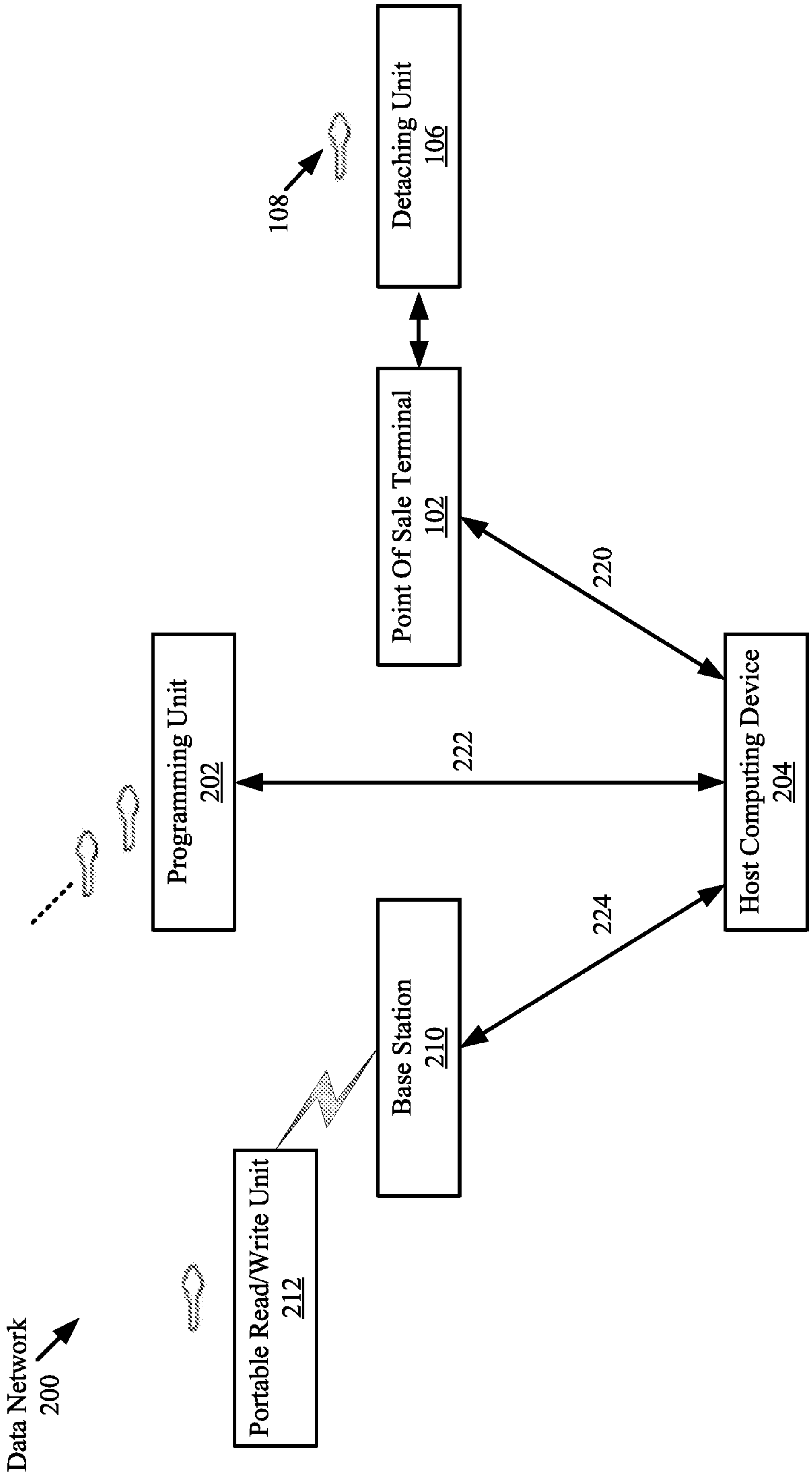
FIG. 2 is an illustration of an illustrative architecture for a data network.

Referring now to FIG. 2, there is provided an illustration of an illustrative architecture for a data network 200 in which the various components of the EAS system 100 are coupled together. Data network 200 comprises a host computing device 204 which stores data concerning at least one of merchandise identification, inventory, and pricing. A first data signal path 220 allows for two-way data communication between the host computing device 204 and the POS terminal 102. A second data signal path 222 permits data communication between the host computing device 204 and a programming unit 202. The programming unit 202 is generally configured to write product identifying data and other information into memory of the security tag 108. A third data signal path 224 permits data communication between the host computing device 204 and a base station 210. The base station 210 is in wireless communication with a portable read/write unit 212. The portable read/write unit 212 reads data from the security tags for purposes of determining the inventory of the retail store, as well as writes data to the security tags. Data can be written to the security tags when they are applied to articles of merchandise.

Figure 3:
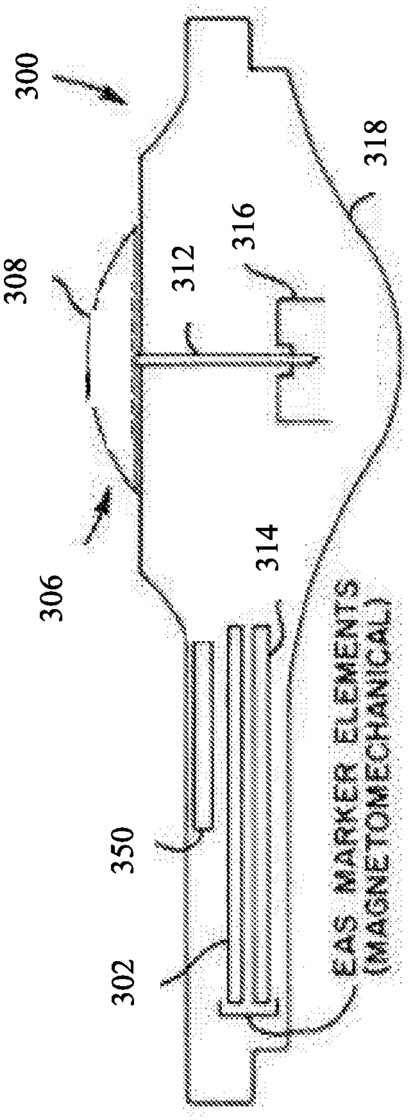
FIG. 3 is a cross sectional view of an illustrative architecture for a security tag.

Referring now to FIG. 3, there is provided a cross sectional view of an illustrative architecture for a security tag 300. Security tag 108 can be the same as or similar to the security tag 300. As such, the discussion of security tag 300 is sufficient to understand security tag 108 of FIGS. 1-2.

As shown in FIG. 3, security tag 300 comprises a housing 318 which is at least partially hollow. The housing 318 can be formed from a rigid or semi-rigid material, such as plastic. A pin (or tack) 306 is removably coupled to the housing 318. The pin 306 comprises a head 308 and a shaft 312. The shaft 312 is inserted into a recessed hole formed in the housing 318. The shaft 312 is held in position within the recessed hole via an electro-mechanical lock mechanism 316, which is mounted inside the housing 318. Electro-mechanical lock mechanisms are well known in the art, and therefore will not be described in detail herein. Any known or to be known electro-mechanical lock mechanism can be used herein without limitation. In some scenarios, the electro-mechanical lock mechanism 316 includes a clamp, latch or other coupler that is actuated by a motor when power is supplied to the electro-mechanical lock mechanism 316. The present solution is not limited in this regard.

A magnetostrictive active EAS element 314 and a bias magnet 302 are optionally also disposed within the housing

318. These components 314, 302 may be the same as or similar to that disclosed in U.S. Pat. No. 4,510,489. In some scenarios, the resonant frequency of components 314, 302 is the same as the frequency at which the EAS system (e.g., EAS system 100 of FIG. 1) operates (e.g., 58 kHz). Additionally, the EAS element 314 is formed from thin, ribbon-shaped strips of substantially completely amorphous metal-metalloid alloy. The bias magnet 302 is formed from a rigid or semi-rigid ferromagnetic material. Embodiments are not limited to the particulars of these scenarios.

During operation, antenna pedestals (e.g., antenna pedestals 112, 116 of FIG. 1) of an EAS system (e.g., EAS system 100 of FIG. 1) emit periodic tonal bursts at a particular frequency (e.g., 58 kHz) that is the same as the resonance frequency of the amorphous strips (i.e., the EAS interrogation signal). This causes the strips to vibrate longitudinally by magnetostriction, and to continue to oscillate after the burst is over. The vibration causes a change in magnetism in the amorphous strips, which induces an AC voltage in an antenna structure (not shown in FIG. 3). The antenna structure (not shown in FIG. 3) converts the AC voltage into a radio wave. If the radio wave meets the required parameters (correct frequency, repetition, etc.), the alarm is activated.

An electronic circuit 350 is also provided within the housing 318. The electronic circuit 350 is generally configured to facilitate a release of the pin from the electro-mechanical lock mechanism 316 and/or a determination as to whether the pin 306 has or has not been successfully released during a POS transaction or other transaction in which removal of the security tag from an article is authorized. The electronic circuit 350 causes an RF signal to be provided to the detaching unit 106 which indicates whether or not the pin 306 has been successfully released.

Figure 4:
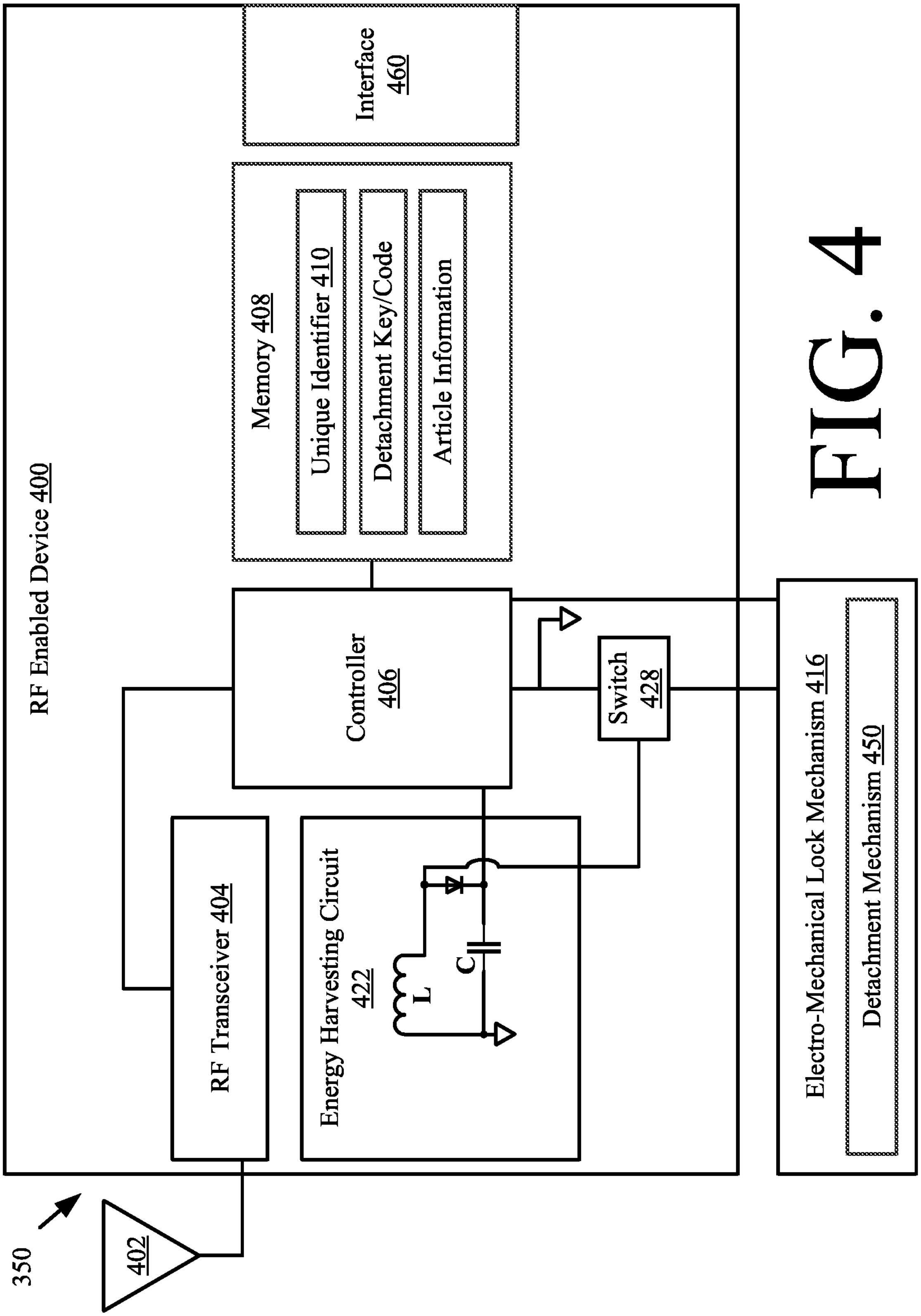
FIG. 4 is a block diagram of an illustrative hardware architecture for the electronic circuit of the security tag show in FIG. 3.

Referring now to FIG. 4, there is provided an illustration of an illustrative architecture for the security tag's electronic circuit 350. Electronic circuit 350 can include more or less components than that shown in FIG. 4. However, the components shown are sufficient to disclose an illustrative embodiment implementing the present solution. Some or all of the components of the electronic circuit 350 can be implemented in hardware, software and/or a combination of hardware and software. The hardware includes, but is not limited to, one or more electronic circuits. The hardware architecture of FIG. 4 represents a representative electronic circuit 350 of a security tag configured to facilitate the prevention of an unauthorized removal of an article from a retail store facility.

The electronic circuit 350 comprises an antenna 402 and an RF enabled device 400. The RF enabled device 400 allows data to be exchanged with the external device via RF technology. The antenna 402 is configured to receive RF signals from the external device and transmit RF signals generated by the RF enabled device 400. The RF enabled device 400 comprises an RF transceiver 404. RF transceivers are well known in the art, and therefore will not be described herein. Any known or to be known RF transceiver can be used here.

During a detachment process, a magnetic field is generated by the detaching unit 106. This magnetic field induces a voltage in a coil L of an energy harvesting circuit 422. In some scenarios, this voltage charges a capacitor C of the energy harvesting circuit 422, when a switch 428 is open. The voltage induced in coil L or the energy stored by the capacitor C is used to power the controller 406.

Additionally, the RF transceiver 404 receives an RF signal from the detaching unit 106. The controller 402 processes the received RF signal to extract information therein. This information can include, but is not limited to, a request for certain information (e.g., a unique identifier 410) and/or detach command.

If the extracted information includes a request for certain information, then the controller 406 may perform operations to retrieve a unique identifier 410 from memory 408. The retrieved information is then sent from the security tag 108 to the detaching unit 106 via an RF communication facilitated by the RF transceiver 404.

If the extracted information includes a detach command, then the controller 406 performs operations to close the switch 428 (which is normally open). Switch 428 can include, but is not limited to, a transistor. When switch 428 is closed, energy is allowed to flow from the energy harvesting circuit 422 to the detachment mechanism 450 of an electro-mechanical lock mechanism 416. The detachment mechanism 450 can include a lock configured to move between a lock state and an unlock state. At this time, actuation of the detachment mechanism 250 may occur. The electro-mechanical lock mechanism 416 then communicates a signal to the controller 406 indicating whether or not actuation of the detachment mechanism 250 occurred for a release of a pin via the unlocking of the lock.

Memory 408 may be a volatile memory and/or a non-volatile memory. For example, the memory 408 can include, but is not limited to, a Random Access Memory ("RAM"), a Dynamic Random Access Memory ("DRAM"), a Static Random Access Memory ("SRAM"), a Read-Only Memory ("ROM") and a flash memory. The memory 408 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Referring now to FIG. 5, there is provided a flow diagram of an illustrative method 500 for verifying a detachment of a security tag (e.g., security tag 108 of FIG. 1) from an article and/or operating a detaching unit. Method 500 begins with 502 and continues with 504 where operations are performed by a detaching unit (e.g., detaching unit 106 of FIG. 1) to detect when the security tag is in proximity thereto. This detection can be made, for example, using a proximity sensor of the detaching unit. The proximity sensor can include, but is not limited to, a beam break sensor and/or a camera. Beam break sensors and cameras are well known in the art, and therefore will not be described herein.

In 506, the detaching unit performs operations to obtain a unique identifier (e.g., unique identifier 410 of FIG. 4) from the security tag. These operations involve: communicating a signal including a request for the unique identifier from the detaching unit to the security tag; and receiving a signal including the unique identifier from the security tag. These communications can be achieved via RF communications.

In 508, the unique identifier is communicated from the detaching unit to a POS terminal (e.g., POS terminal 102 of FIG. 1). The POS terminal performs operations in 510 to verify that the unique identifier is valid for a security tag of an EAS system (e.g., EAS system 100 of FIG. 1). This verification process can involve comparing the unique identifier to a list of unique identifiers, and verifying that the unique identifier is a valid identifier when a match exists between the unique identifier and an entry in the list. The list can be stored in an internal memory of the detaching unit and/or in a remote datastore which is accessible to the detaching unit. The remote datastore can include, but is not limited to, a database.

Next in 512, a determination is made as to whether or not a pin (e.g., pin (or tack) 306 of FIG. 3) has been removed from the security tag. This determination can be made by the detaching unit based on information input into the POS system by a user (e.g., using a keypad of the POS station or detaching unit) and/or information received from the security tag via a wireless communication. If the pin has been removed from the security tag [512:YES], then 514 is performed where the article is accepted for a purchase transaction and added to a list of articles being purchased. Techniques for accepting articles for purchase and adding them to lists of articles being purchased are well known in the art, and therefore will not be described herein. Thereafter, method 500 returns to 504.

If the pin has not been removed from the security tag [512:NO], then a detachment process is initiated by the detaching unit as shown by 516. The detaching unit also resets a counter in 518. Counters are well known in the art, and therefore will not be described herein. Any known or to be known counter can be used herein. The counter may be internal to the detaching unit or external to the detaching unit.

Next, method 500 continues with 520-522 and 524-532. 520-522 are shown as being performed concurrently with 524-532. The present solution is not limited in this regard. In other scenarios, 520-522 are performed subsequent to 524-532.

520-522 involve communicating a detach command from the detaching unit to the security tag and incrementing the counter. 524-532 involve: applying power to a field source (e.g., a coil) of the detaching unit; generating a magnetic field by the field source of the detaching unit; using the magnetic field to induce a voltage in a coil (e.g., inductor L of FIG. 4); optionally use the voltage to charge a capacitor (e.g., capacitor C of FIG. 4) of the tag; and using the induced voltage or stored energy of the capacitor to power a controller (e.g., controller 406 of FIG. 4) of the tag.

Upon completing 522 and/or 532, the controller causes power to be supplied to the tag's electro-mechanical lock mechanism (e.g., electro-mechanical lock mechanism 416 of FIG. 4) in response to the detach command, as shown by 534. In this regard, the controller can perform operations to close a switch (e.g., switch 428 of FIG. 4) for allowing energy to flow from an energy harvesting circuit (e.g., energy harvesting circuit 422 of FIG. 4) to the electro-mechanical lock mechanism. This supply of power to electro-mechanical lock mechanism may cause actuation of a detachment mechanism (e.g., detachment mechanism 450 of FIG. 4) for releasing a pin (e.g., pin 306 of FIG. 3). For example, a clamp or lock is actuated such that the pin is released therefrom. The present solution is not limited to the particulars of this example.

Figure 5A:
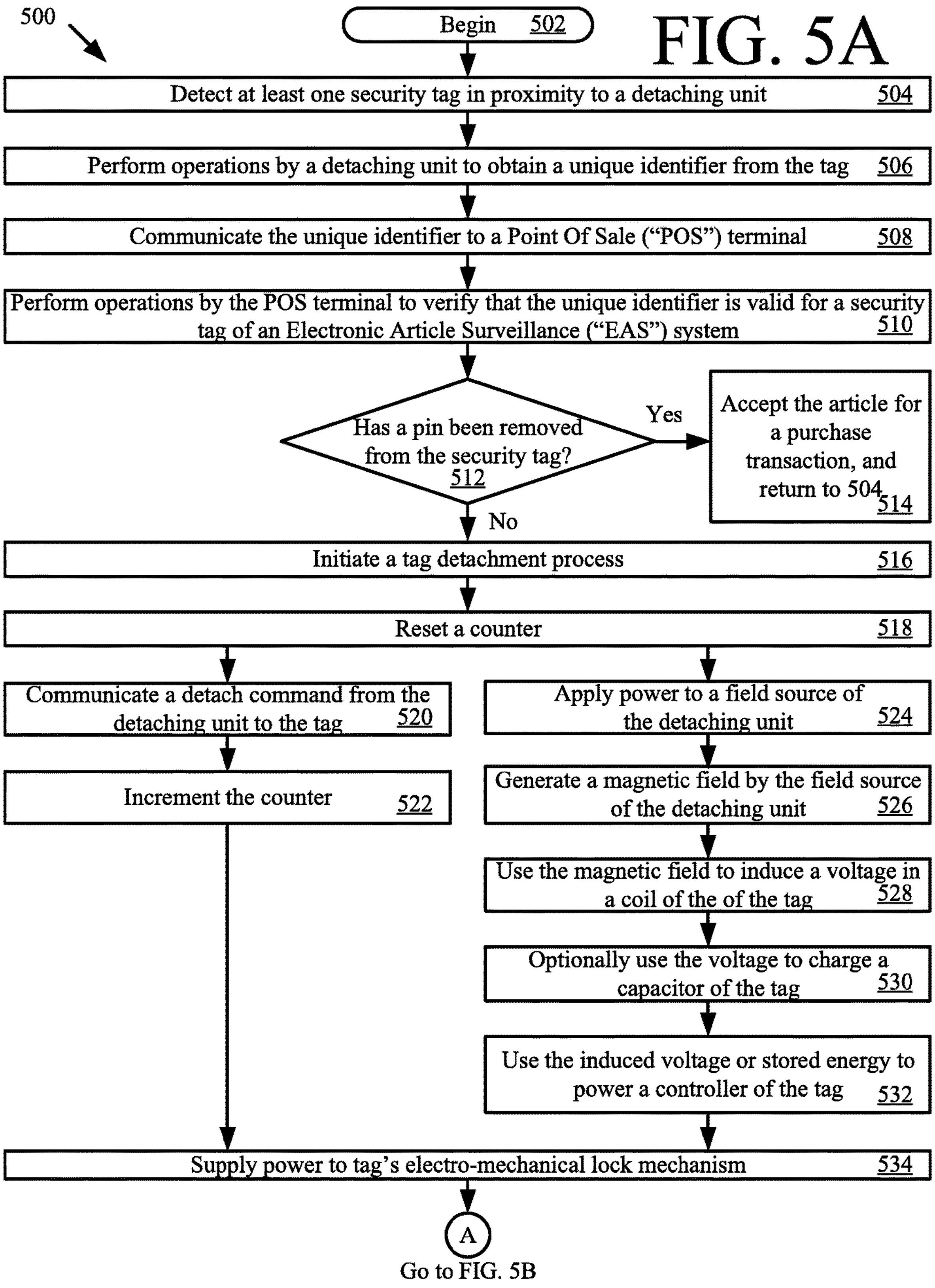
FIGS. 5A-5B (collectively referred to as "FIG. 5") provide a flow diagram of an illustrative method for verifying a detachment of a security tag from an article and/or operating a detaching unit.
Figure 5B:
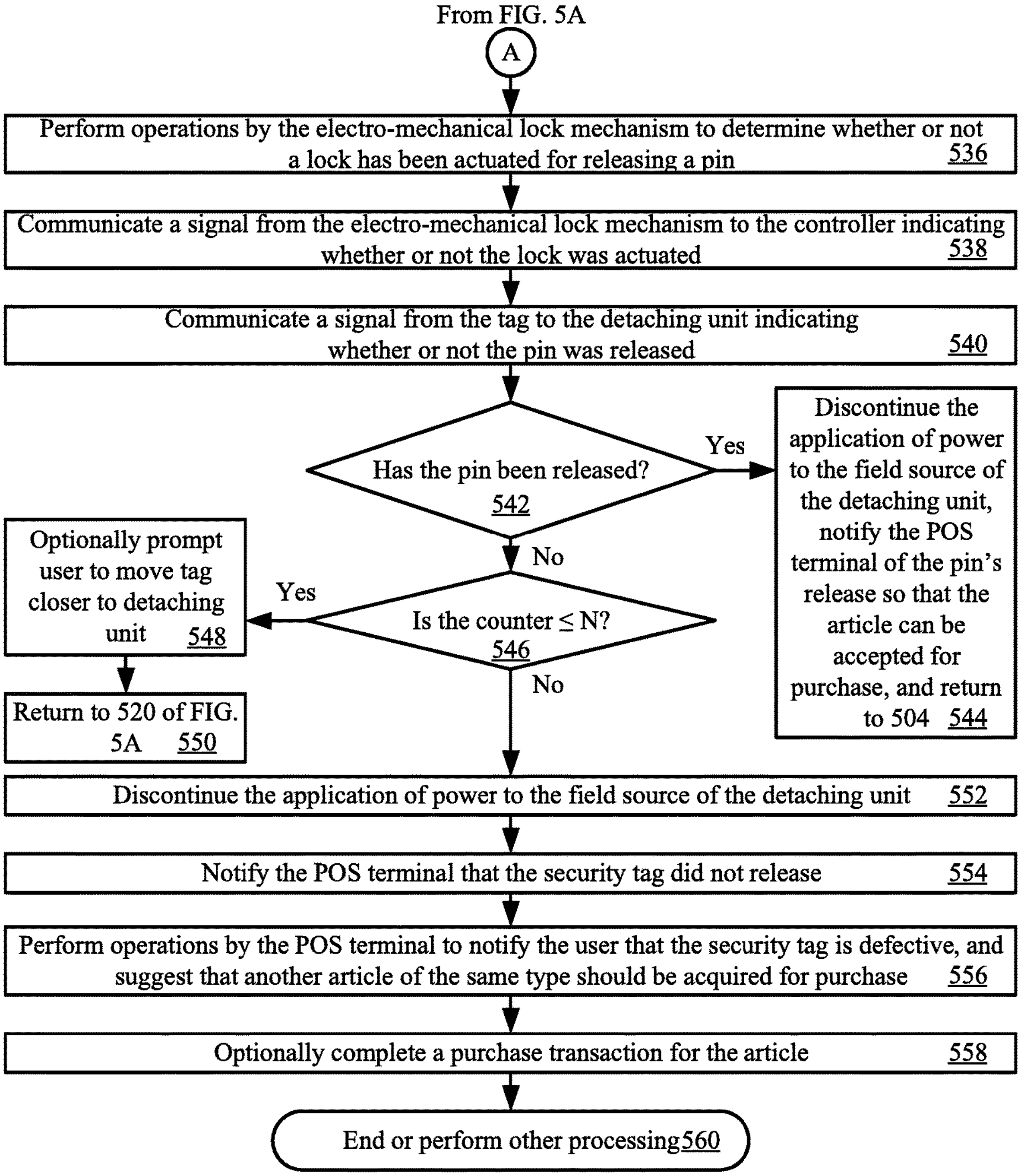

Next, method 500 continues with 536 of FIG. 5B. As shown in FIG. 5B, 536 involves performing operations by the electro-mechanical lock mechanism to determine whether or not a lock has been actuated for releasing a pin. In this regard, it should be understood that the electro-mechanical lock mechanism can use sensor data or feedback data for making this determination. For example, a sensor is provided in the electro-mechanical lock mechanism that detects movement of the lock. The present solution is not limited to the particulars of this example. A signal is then communicated from the electro-mechanical lock mechanism to the controller in 538. The signal indicates whether or not the lock was actuated. In 540, a signal is communicated from the tag (e.g., via RF transceiver 404 of FIG. 4) to the detaching unit indicating whether or not the pin was released.

If the pin was released [542:YES], then 544 is performed where the detaching unit discontinues the application of power to the field source. The detaching unit also notifies the POS terminal of the pin's release so that the article can be accepted for purchase. Method 500 then returns to 504 of FIG. 5A.

If the pin was not released [542:NO], then 546 is performed where a decision is made (e.g., by the detaching unit) as to whether the counter has a value less than or equal to N. N is an integer (e.g., 3). When the counter is less than or equal to N [546:YES], then 548-550 are performed. 548-550 involve: optionally causing operations to be performed by the POS terminal to prompt a user to move the tag closer to the detaching unit; and/or returning to 520 of FIG. 5A.

If the counter has a value greater than N [546:NO], then 552-558 are performed. 552-558 involve: discontinuing the application of power to the field source of the detaching unit; notifying the POS terminal that the security tag did not release; performing operations by the POS terminal to notify the user that the security tag is defective and to suggest that another article of the same type should be acquired for purchase; and/or optionally completing a purchase transaction for the article. Purchase transactions are well known in the art, and therefore will not be described herein. Any known or to be known purchase transaction technique can be used herein without limitation. Subsequently, 560 is performed where method 500 ends or other processing is performed.

Figure 6:
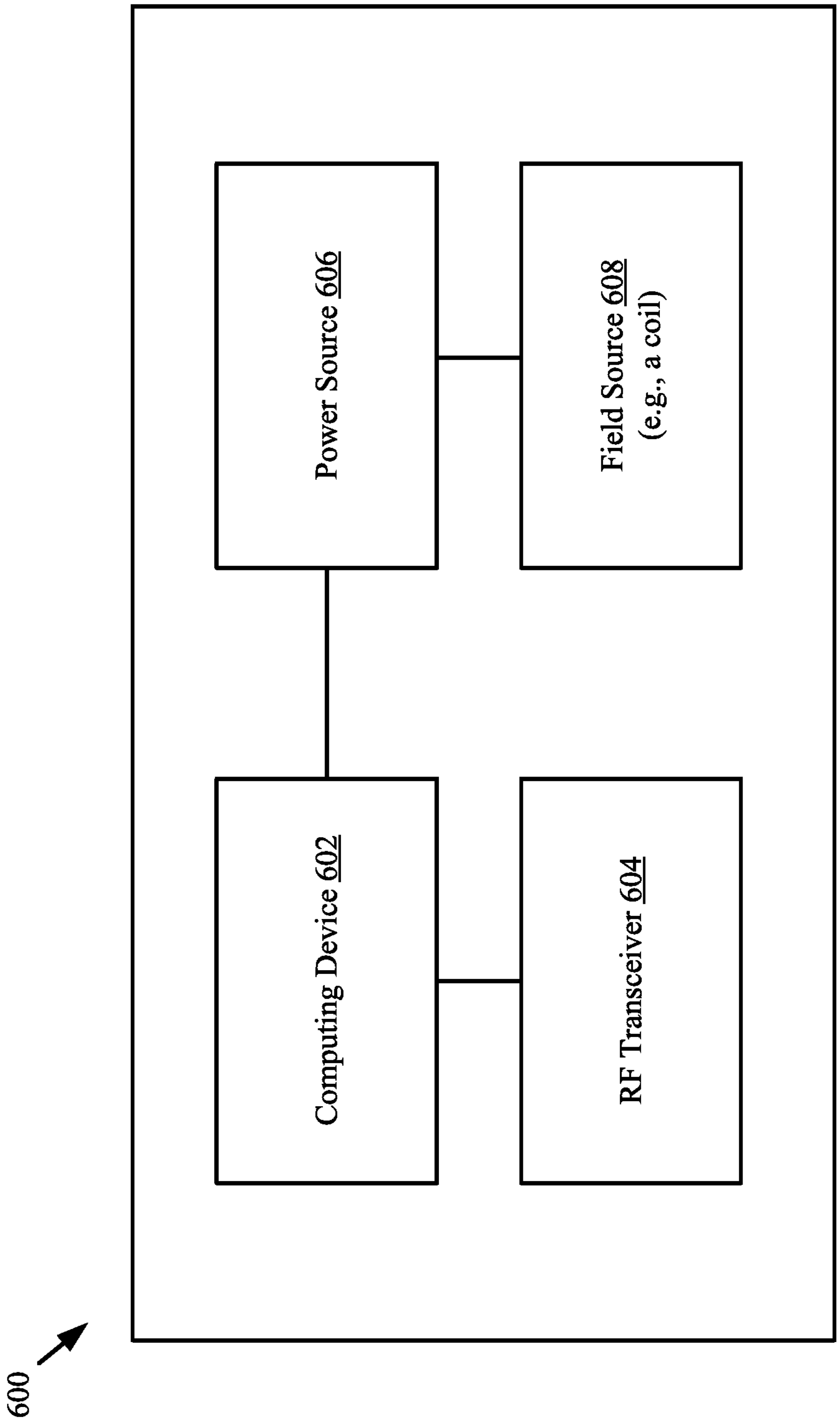
FIG. 6 provides an illustration of an illustrative architecture for a detaching unit FIG. 7 provides an illustration of an illustrative architecture for a computing device.

As noted above, detaching units are known in the art. Still, an illustrative detaching unit architecture will now be described in some detail. Referring now to FIG. 6, there is provided an illustration of an illustrative architecture 600 for a detaching unit (e.g., detaching unit 106 of FIG. 1). The present solution is not limited to this illustrative detaching unit architecture.

As shown in FIG. 6, the detaching unit architecture 600 comprises a computing device 602, an RF transceiver 604, a power source 606 (e.g., AC mains), and a field source 608 (e.g., a coil). RF transceivers, power sources and field sources are well known in the art, and therefore will not be described in detail herein. Still, it should be noted that the computing device 602 controls when the RF transceiver 604 and power source 606 for performing all or some of the above-described methods for verifying a detachment of a security tag (e.g., security tag 108 of FIG. 1) from an article.

Figure 7:
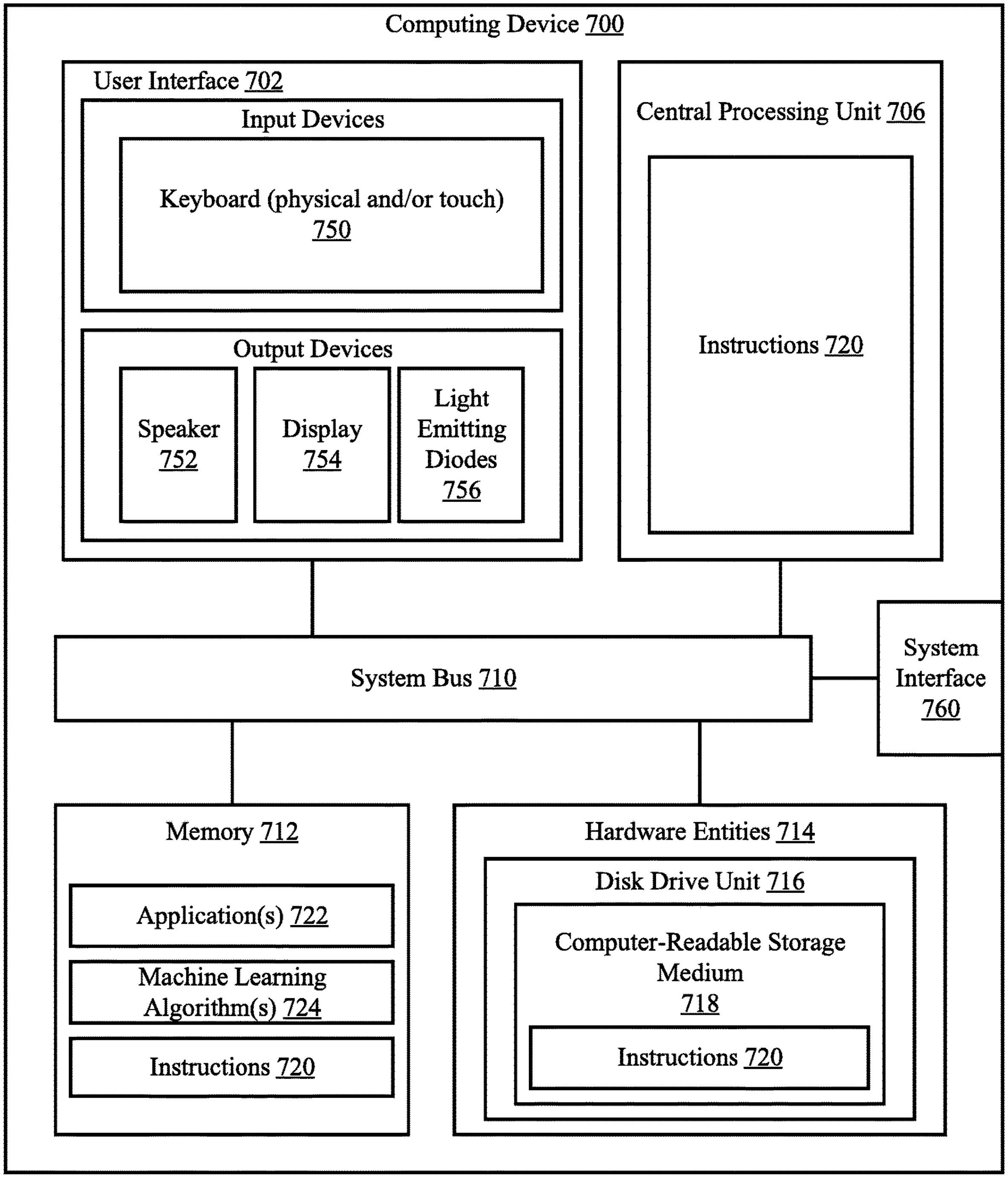

Referring now to FIG. 7, there is provided an illustration of an illustrative architecture for a computing device 700. Computing device 602 of FIG. 6 is the same as or substantially similar to computing device 700. As such, the discussion of computing device 700 is sufficient for understanding computing device 602.

In some scenarios, the present solution is used in a client-server architecture. Accordingly, the computing device architecture shown in FIG. 7 is sufficient for understanding the particulars of client computing devices and servers.

Computing device 700 may include more or less components than those shown in FIG. 7. However, the components shown are sufficient to disclose an illustrative solution implementing the present solution. The hardware architecture of FIG. 7 represents one implementation of a representative computing device configured to provide an improved item return process, as described herein. As such, the computing device 700 of FIG. 7 implements at least a portion of the method(s) described herein.

Some or all components of the computing device 700 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 7, the computing device 700 comprises a user interface 702, a Central Processing Unit ("CPU") 706, a system bus 710, a memory 712 connected to and accessible by other portions of computing device 700 through system bus 710, a system interface 760, and hardware entities 714 connected to system bus 710. The user interface can include input devices and output devices, which facilitate user-software interactions for controlling operations of the computing device 700. The input devices include, but are not limited, a physical and/or touch keyboard 750. The input devices can be connected to the computing device 700 via a wired or wireless connection (e.g., a Bluetooth® connection). The output devices include, but are not limited to, a speaker 752, a display 754, and/or light emitting diodes 756. System interface 760 is configured to facilitate wired or wireless communications to and from external devices (e.g., network nodes such as access points, etc.).

At least some of the hardware entities 714 perform actions involving access to and use of memory 712, which can be a Radom Access Memory ("RAM"), a disk driver and/or a Compact Disc Read Only Memory ("CD-ROM"). Hardware entities 714 can include a disk drive unit 716 comprising a computer-readable storage medium 718 on which is stored one or more sets of instructions 720 (e.g., software code) configured to implement one or more of the methodologies, procedures, or functions described herein. The instructions 720 can also reside, completely or at least partially, within the memory 712 and/or within the CPU 706 during execution thereof by the computing device 700. The memory 712 and the CPU 706 also can constitute machine-readable media. The term "machine-readable media", as used here, refers to a single medium or multiple media (e.g., a centralized or distributed database, and/or associated caches and servers) that store the one or more sets of instructions 720. The term "machine-readable media", as used here, also refers to any medium that is capable of storing, encoding or carrying a set of instructions 720 for execution by the computing device 700 and that cause the computing device 700 to perform any one or more of the methodologies of the present disclosure.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

I claim:

1. A method for verifying a detachment of a security tag from an article, comprising:

using a voltage induced in an internal circuit of the security tag by a magnetic field generated by a detaching unit to power a controller of the security tag;

receiving, by the security tag, a first signal sent from the detaching unit;

selectively supplying power to an electro-mechanical lock mechanism of the security tag for a certain amount of time to cause a pin to be released from a lock, in response to the first signal;

detecting, by the electro-mechanical lock mechanism, whether or not the pin was released; and communicating, from the security tag to the detaching unit, a second signal in response to the detection, the second signal indicating whether or not the pin was released;

wherein the voltage is no longer induced in the internal circuit by the detaching unit when the second signal indicates that the pin was released;

wherein the detaching unit is distinct from the security tag; and wherein the detection triggers the communication of the second signal.

2. The method according to claim 1, further comprising:

receiving a third signal from the detaching unit when the second signal indicates that the pin was not released;

selectively supplying the power once again to the electro-mechanical lock mechanism for the certain amount of time, in response to the third signal; and communicating, from the security tag, a fourth signal indicating whether or not the pin was released.

3. The method according to claim 2, wherein a counter is incremented when the second signal indicates that the pin was not released, prior to when the third signal is sent from the detaching unit.

4. The method according to claim 2, wherein the voltage is no longer induced in the internal circuit by the detaching unit when the fourth signal indicates that the pin was released.

5. The method according to claim 1, wherein the article is accepted for purchase when the second signal indicates that the pin was released.

6. The method according to claim 1, wherein a determination is made as to whether a value of a counter is less than or equal to a given number, when the second signal indicates that the pin was not released.

7. The method according to claim 6, further comprising repeating the using, receiving, selectively supplying and communicating when the second signal indicates that the pin was not released and the value of the counter is less than or equal to the given number.

8. The method according to claim 6, wherein the voltage is no longer induced in the internal circuit by the detaching unit when the second signal indicates that the pin was not released and when the value of the counter exceeds the given number.

9. A security tag, comprising:

an internal circuit in which a voltage is induced in an internal circuit of the security tag by a magnetic field generated by a detaching unit;

a controller that is powered using the voltage induced in the internal circuit;

a communication enabled device that receives a first signal sent from the detaching unit;

an electro-mechanical lock mechanism that is selectively supplied power for a certain amount of time to cause a pin to be released from a lock, in response to the first signal, and detects whether or not the pin was released;

wherein the communication enabled device communicates a second signal to the detaching unit in response to the detection, the second signal indicating whether or not the pin was released;

wherein the voltage is no longer induced in the internal circuit by the detaching unit when the second signal indicates that the pin was released;

wherein the detaching unit is distinct from the security tag; and wherein the detection triggers the communication of the second signal.

10. The security tag according to claim 9, wherein:

the communication enabled device receives a third signal from the detaching unit when the second signal indicates that the pin was not released;

the electro-mechanical lock mechanism is selectively supplied power once again for the certain amount of time, in response to the third signal; and the communication enabled device communicates a fourth signal indicating whether or not the pin was released.

11. The security tag according to claim 10, wherein a counter is incremented when the second signal indicates that the pin was not released, prior to when the third signal is sent from the detaching unit.

12. The security tag according to claim 10, wherein the voltage is no longer induced in the internal circuit by the detaching unit when the fourth signal indicates that the pin was released.

13. The security tag according to claim 9, wherein an article is accepted for purchase when the second signal indicates that the pin was released.

14. The security tag according to claim 9, wherein a determination is made as to whether a value of a counter is less than or equal to a given number, when the second signal indicates that the pin was not released.

15. The security tag according to claim 14, wherein operations are once again performed by the security tag for releasing the pin, when the second signal indicates that the pin was not released and the value of the counter is less than or equal to the given number.

16. The security tag according to claim 14, wherein the voltage is no longer induced in the internal circuit by the detaching unit when the second signal indicates that the pin was not released and when then value of the counter exceeds the given number.

* * * * *